(12) United States Patent
Potisek et al.

(10) Patent No.: US 10,138,417 B2
(45) Date of Patent: Nov. 27, 2018

(54) PROPPANT COMPRISING AN OIL WELL TREATMENT AGENT COATING

(71) Applicant: Dow Global Technologies LLC, Midland, MI (US)

(72) Inventors: Stephanie L. Potisek, Houston, TX (US); Kaoru Aou, Lake Jackson, TX (US); Juan Carlos Medina, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/516,786

(22) PCT Filed: Nov. 18, 2015

(86) PCT No.: PCT/US2015/061262
§ 371 (c)(1),
(2) Date: Apr. 4, 2017

(87) PCT Pub. No.: WO2016/089599
PCT Pub. Date: Jun. 9, 2016

(65) Prior Publication Data
US 2017/0260445 A1    Sep. 14, 2017

Related U.S. Application Data

(60) Provisional application No. 62/087,860, filed on Dec. 5, 2014.

(51) Int. Cl.
*E21B 43/267* (2006.01)
*C09K 8/80* (2006.01)
*C09K 8/524* (2006.01)
*C09K 8/528* (2006.01)
*E21B 43/26* (2006.01)

(52) U.S. Cl.
CPC .............. *C09K 8/805* (2013.01); *C09K 8/524* (2013.01); *C09K 8/528* (2013.01); *E21B 43/26* (2013.01); *E21B 43/267* (2013.01); *C09K 2208/32* (2013.01)

(58) Field of Classification Search
CPC ...... E21B 43/267; E21B 43/26; E21B 33/138; E21B 37/06; C09K 8/805; C09K 8/80; C09K 8/68; C09K 8/72; C09K 8/665; C09K 2208/08; C09K 2208/32; C09K 2208/28
See application file for complete search history.

(56) References Cited

U.S. PATENT DOCUMENTS

| 7,686,081 | B1 | 3/2010 | Becker |
| 8,003,214 | B2 | 8/2011 | Rediger et al. |
| 8,133,587 | B2 | 3/2012 | Rediger et al. |
| 8,763,700 | B2 | 7/2014 | McDaniel |
| 8,770,294 | B2 | 7/2014 | Tanguay et al. |
| 8,852,682 | B2 | 10/2014 | Sinclair et al. |
| 8,883,695 | B2 | 11/2014 | Eoff et al. |
| 2016/0075941 | A1* | 3/2016 | Duenckel ............... C09K 8/805 166/280.2 |

* cited by examiner

Primary Examiner — Zakiya W Bates

(57) ABSTRACT

Embodiments relate to coated proppants, a method of making the coated proppants, and a method to use coated proppants in fracturing subterranean formations around oil and gas wells to improve oil recovery. The proppants are coated with an oil well treatment agent, specifically, a wax inhibitor and/or a pour point depressant composition.

9 Claims, No Drawings

PROPPANT COMPRISING AN OIL WELL TREATMENT AGENT COATING

FIELD OF THE INVENTION

The present invention relates to coated particles typically used as proppants in fracturing subterranean formations around oil and gas wells and, more preferably, to proppants coated with an oil well treatment agent, specifically, a wax inhibitor composition and/or pour point depressant composition and a method for the preparation of said coated proppant.

BACKGROUND OF THE INVENTION

In oil and gas wells, it often becomes necessary to stimulate hydrocarbon flow in order to attain economical feasible production rates, or to increase production rates. The technique frequently used to stimulate wells in such a manner is termed "fracturing", and refers to a method of pumping a fluid into the well until the pressure increases to a level sufficient to fracture the subterranean geological formation, resulting in cracks in the formation. These cracks are capable of carrying product to the well bore at a significantly higher flow rate, particularly from so-called "tight" formations such as shale basins (e.g. Marcellus, Haynesville, etc).

In general, proppants are extremely useful to keep open fractures imposed by hydraulic fracturing of a subterranean formation, e.g., an oil or gas bearing strata. Typically, the fracturing is desired in the subterranean formation to increase oil or gas production. As noted above, fracturing is caused by injecting a viscous fracturing fluid, foam, or other suitable fluid at high pressure into the well to form fractures. As the fracture is formed, a particulate material, referred to as a "propping agent" or "proppant" is placed in the formation to maintain the fracture in a propped condition when the injection pressure is released. As the fracture forms, the proppants are carried into the well by suspending them in additional fluid or foam to fill the fracture with a slurry of proppant in the fluid or foam. Upon release of the injection pressure, the proppants form a "pack" which serves to hold open the fractures. The goal of using proppants is to increase production of oil and/or gas, and other hydrocarbons such as natural gas condensates, by providing a highly conductive channel in the formation.

Coatings for proppants are known, for example coatings to improve proppant thermal stability for high temperature/pressure applications, see U.S. Pat. No. 8,770,294; for improving proppant compressive strength, see U.S. Pat. No. 8,852,682; for improving proppant back flow, see U.S. Pat. Nos. 8,003,214 and 8,133,587; and for removing contaminants, such as heavy metals, see U.S. Pat. No. 8,763,700.

It is desirable to inject one or more oil well treatment agent within the fracturing fluid and proppant mixture which impart useful chemical properties (e.g., scale inhibition, corrosion inhibition, wax inhibition, and/or pour point depression, to name a few) to the production fluids coming out of the formation. Unfortunately, many such oil well treatment additives are not compatible with the fracturing fluids or foams. One solution to the solubility issue is adding a dispersion of treatment agents adsorbed on an adsorbent media, see U.S. Pat. Nos. 7,686,081 and 8,883,695. However, adding additional components increases the number of components added to the fluid/foam resulting in additional compatibility and handling/storage considerations.

Notwithstanding these various approaches, the interest in developing an efficient and cost effective way to add oil well treatment agents, especially pour point depressants and/or wax inhibitors, with proppants in oil well recovery operations remains strong.

SUMMARY OF THE INVENTION

The present invention is a coated proppant for treating oil comprising i) a particle and ii) a coating wherein the coating will slowly dissolve in oil such that the treatment agent can treat oil in its intended manner, said coating comprising one or more treatment agent selected from a wax inhibitor, a pour point depressant, a scale inhibitor, an asphaltene inhibitor, an asphaltene dispersant, a corrosion inhibitor, a biocide, a drag reducing agent, a viscosity modifier, a dust control agent, or a de-emulsifier, preferably said coating is a wax inhibitor and/or a pour point depressant comprising an ethylene-vinyl acetate copolymer, more preferably the coating comprises a) an ethylene-vinyl acetate copolymer in an amount of from 80 to 99 weight percent; b) a dispersing agent in an amount of from 1 to 20 weight percent; and c) optionally an aqueous freezing point depressant, wherein weight percents are based on the total weight of the coating.

In another embodiment of the coating disclosed herein above, the oil well treatment agent further comprises a cross-linked polyurethane polymer.

Another embodiment of the present invention is a method of preparing the coated proppant for treating oil disclosed herein above, the method comprising applying a coating wherein the coating will slowly dissolve in oil such that the treatment agent can treat oil in its intended manner, said coating comprising one or more treatment agent selected from a wax inhibitor, a pour point depressant, a scale inhibitor, an asphaltene inhibitor, an asphaltene dispersant, a corrosion inhibitor, a biocide, a drag reducing agent, a viscosity modifier, or a de-emulsifier, preferably said coating is a wax inhibitor and/or a pour point depressant comprising an ethylene-vinyl acetate copolymer, more preferably the coating comprises a) an ethylene-vinyl acetate copolymer in an amount of from 80 to 99 weight percent; b) a dispersing agent in an amount of from 1 to 20 weight percent; and c) optionally an aqueous freezing point depressant, wherein weight percents are based on the total weight of the coating, more preferably the wax inhibitor and/or pour point depressant comprising an ethylene-vinyl acetate copolymer is applied onto the particle as an aqueous dispersion.

In another embodiment of the method of preparing a coated proppant disclosed herein above, the oil well treatment agent further comprises a cross-linked polyurethane polymer.

Another embodiment of the present invention is a method of treating a subterranean formation comprising the step of: injecting a fluid suspension of the oil well treatment agent coated proppant disclosed herein above into the subterranean formation at a rate sufficient to increase pressure at the target depth, to exceed that of the fracture gradient of the rock, wherein the coated proppant comprises: i) a particle and ii) a coating wherein the coating will slowly dissolve in oil such that the treatment agent can treat oil in its intended manner, said coating comprising one or more treatment agent selected from a wax inhibitor, a pour point depressant, a scale inhibitor, an asphaltene inhibitor, an asphaltene dispersant, a corrosion inhibitor, a biocide, a drag reducing agent, a viscosity modifier, a dust control agent, or a de-emulsifier, preferably said coating is a wax inhibitor and/or a pour point depressant comprising an ethylene-vinyl acetate copolymer, more preferably the coating comprises a) an ethylene-vinyl acetate copolymer in an amount of from 80 to 99 weight percent; b) a dispersing agent in an amount of from 1 to 20 weight percent; and c) optionally an aqueous freezing point depressant, wherein weight percents are based on the total weight of the coating, more preferably the wax inhibitor and/or pour point depressant comprising an ethylene-vinyl acetate copolymer is applied onto the particle as an aqueous dispersion.

In another embodiment of the method of treating a subterranean formation disclosed herein above, the oil well treatment agent further comprises a cross-linked polyurethane polymer.

DETAILED DESCRIPTION OF THE INVENTION

The coated proppant of the present invention is formed by coating a proppant with one or more of several possible well treatment agents. The oil well treatment agents may include, for example, one or more wax (or paraffin) inhibitors, pour point depressants; scale inhibitors; asphaltene inhibitors; asphaltene dispersants; corrosion inhibitors; biocides; drag reducing agents, viscosity modifiers, de-emulsifiers; and the like or a mixture of any two or more of the foregoing.

Suitable scale inhibitors include, for example, triethanolamine phosphate esters, methacrylic diphosphonate homopolymers, acrylic acid-allyl ethanolamine diphosphonate copolymers, sodium vinyl sulphate-acrylic acid-maleic acid-diethylene triamine allyl phosphonate terpolymers, polyaspartic acids, polycarboxylates, polyacrylic acids, polymaleic acids, polymethacrylic acids, and the like. Suitable asphaltene inhibitors and dispersants include, for example, sorbitan monooleate, polyisobutylene succinic anhydride, alkyl succinimides, alkyl phenol-formaldehyde copolymers, polyolefin esters, polyester amides, maleic anhydride functionalized polyolefins, polyamides, polyimides, alkylaryl sulfonic acids, phosphonocarboxylic acids, and the like.

Suitable wax inhibitors include, for example, paraffin crystal modifiers, and dispersant/crystal modifiers.

Suitable de-emulsifiers include polyalkoxylate block copolymers, alkylphenol-aldehyde resins, polyalkoxylates of polyols or glycidyl ethers, polyamine polyalkoxylates, polyurethanes, and polysilicones.

Suitable corrosion inhibitors include, but are not limited to the amine salts of carboxylic acids, polyhydroxy and ethoxylated amines, quaternary ammonium salts, and amidoamines.

Suitable biocides can include, but are not limited to cationic polymers, isothiazolones, organic thiocyanates, quaternary phosphonium compounds, quaternary ammonium surfactants, and alkylamines.

Suitable drag-reducing agents can include, but are not limited to polyalkanes, polymethacrylates and polyacrylates.

Suitable paraffin crystal modifiers may include, for example, ethylene-vinyl acetate copolymers (e.g., ELVAX™ 150W available from DuPont), styrene maleic anhydride copolymers, olefinic maleic anhydride copolymers, fatty alcohol esters of olefin maleic anhydride copolymers, acrylate copolymers and acrylate polymers of fatty alcohol esters, methacrylate ester copolymers, polyethyleneimines, and alkyl phenol—formaldehyde copolymers and the like. Particular suitable dispersants may include, for example, dodecyl benzene sulfonate, oxyalkylated alkylphenols, oxyalkylated alkylphenolic resins and the like.

Suitable wax inhibitors and pour point depressants include thermoplastic homopolymers and copolymers. A suitable thermoplastic polymer for the present invention is a copolymer of ethylene with at least one vinyl ester of a saturated aliphatic $C_1$ to $C_{24}$-carboxylic acid, for example, see U.S. Pat. No. 3,382,055. In such polymers, different vinyl esters can concurrently be used. The polymers can in principle be prepared by bulk, emulsion, or solution polymerization. As comonomers, for example, vinyl esters of acetic acid, propionic acid, butyric acid, 2-ethylhexane carboxylic acid, pelargonic acid, and stearic acid, particularly $C_2$ to $C_4$-carboxylic acids, and especially vinyl acetate, can be used. A preferred thermoplastic polymer is an ethylene-vinyl acetate copolymer. In general, the vinyl ester content is in the range from 10 to 80 percent, preferably 15 to 45 percent, and more preferably 18 to 32 percent by weight.

Copolymers having a vinyl ester content less than 30 percent may be suitably prepared by a bulk high-pressure process.

Copolymers having from 3 to 20 molar parts of ethylene per molar part of vinyl acetate, having a molecular weight of 1,000 to 2,900, having a slight degree of branching of the ethylene chains, and prepared by free radical solution polymerization are described in German Patent Publication No. 1,914,756. The melt viscosity index, determined according to ASTM Test-Method D 1238-6 T, is between 1 and 800 grams per 10 minutes (g/10 min), preferably 5 to 400 g/10 min, more preferably 5 to 150 g/10 min. Commercially available ethylene-vinyl acetate copolymers comprising 2 to 45 percent by weight of vinyl acetate and having a melt viscosity index of 6 to 150 g/10 min, such as are sold under the name ELVAX™ from DuPont, are useful in the present invention. Unless otherwise noted, melt viscosity index is determined according to ASTM D1238 at 190° C. and a load of 2.16 kilograms (kg).

Another suitable wax inhibitor and/or pour point depressant is a polyurethane polymer which is the reaction product of one or more isocyanate and one or more polyol. The polyurethane preferably has an average functionality from about 1.9 to 4, and more preferably from 2.0 to 3.5 and still more preferably from 2.2 to 3.5. The average isocyanate equivalent weight can be from about 80 to 500, is more preferably from 80 to 200 and still more preferably from 125 to 175

The isocyanates can be aromatic, aliphatic and/or cycloaliphatic. Exemplary isocyanates include, for example, m-phenylene diisocyanate, 2,4-and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI (Hi2 MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane triisocyanate, polymethylene polyphenyl isocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI. Preferred isocyanates are available from The Dow Chemical Company under the tradename PAPI™ polymeric isocyanates.

The polyol is a compound or mixture of compounds having an average of at least 2 hydroxyl groups per molecule. To produce a polymer having the necessary glass transition temperature, the average functionality (number of hydroxyl groups per molecule) of the polyols preferably is somewhat higher, such as at least 2.5, preferably 2.5 to 6 and more preferably 3 to 4. A low average hydroxyl equivalent weight also favors the production of a polymer having the needed glass transition temperature. It is preferred that the polyol(s) have an average hydroxyl equivalent weight from 31 to 200, especially 50 to 150 and more preferably 60 to 100. If a mixture of polyols is used, some or all of the polyol(s) may have functionalities outside of the foregoing ranges; however, in such a case the mixture of polyols preferably has a functionality and hydroxyl equivalent weight as described above. Polyols that are suitable for preparing the organic polymer include hydroxy-functional acrylate polymers and copolymers, hydroxy-functional polybutadiene polymers, polyether polyols, polyester polyols, and various polyols that are based on vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers and copolymers of propylene oxide and ethylene oxide in which the oxyethylene content is, for example, from about 1 to about 30% by weight. Preferred polyether polyols are available from The Dow Chemical Company under the tradename VORANOL™ Polyetherpolyols.

Polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with alkyl, aryl or halogen. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less, preferably 75 or less, and include ethylene glycol, 1,2-and 1,3-propylene glycol, 1,4-and 2,3-butane diol, 1,6-hexane diol, 1,8-octane diol, neopentyl glycol, cyclohexane dimethanol, 2-methyl-1,3-propane diol, glycerine, trimethylolpropane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful. Other useful polyols include castor oil and compounds having a hydroxyl equivalent weight of 30 to 125, such as ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, cyclohexanedimethanol, triethanolamine, tri(isopropanol) amine, glycerine, trimethylol propane, trimethylol ethane, pentaerythritol, sucrose, sorbitol, and alkanolamines such as diethanol amine, diisopropanol amine, monoethanol amine, monoisopropanolamine, alkoxylates of any of the foregoing, and the like.

In addition to isocyanate and polyol, it is often desirable to employ certain other ingredients in preparing polyurethane polymers. Among these additional ingredients are catalysts, surfactants, preservatives, antioxidants, reinforcing agents, stabilizers and fillers, recycled polyurethane powder, cross-linkers, and the like.

A preferred polyurethane polymer is a cross-linked polyurethane polymer.

The oil well treatment agent useful in the present invention may be applied to the surface of the proppant to form a coating in it's neat form, e.g., the oil well agent is a thermoplastic polymer, or is applied as a dispersion. Preferably the oil well treatment agent coating composition of the present invention is applied to the proppant in the form of a dispersion, preferably an aqueous dispersion, wherein the amount of oil well treatment agent is present in the dispersion in an amount equal to or greater than 15 weight percent, more preferably in an amount equal to or greater than 20 weight percent, and more preferably in an amount equal to or greater than 25 weight percent based on the total weight of the oil well treatment agent dispersion composition. Preferably the oil well treatment agent used in the dispersion composition of the present invention is used in an amount equal to or less than 50 weight percent, more preferably in an amount equal to or less than 45 weight percent, and more preferably in an amount equal to or less than 40 weight percent based on the total weight of the oil well treatment agent dispersion composition.

In addition to the oil well treatment agent, dispersions described herein may include a dispersing agent. As used here in the term "dispersing agent" means an agent that aids in the formation and/or stabilization of a dispersion. Some dispersing agents can also be used to form emulsions and are described in detail by Paul Becher (Emulsions: Theory and Practice, $3^{rd}$ edition, Oxford University, New York, 2001), incorporated herein by reference in its entirety. Suitable dispersing agents, sometimes referred to as surfactants, for use in the present invention as component ii can be classified as anionic, cationic, zwitterionic, or non-ionic. Anionic surfactants include substances containing a long lipophilic tail bonded to a water-soluble (hydrophilic) group, wherein the hydrophilic group contains an anionic moiety such as a carboxylic acid, sulfonic acid, or phenolic group, neutralized by a cation such as an alkali metal or ammonium. The lipophilic tail is preferably an alkyl group, typically having about 8 to about 25 carbon atoms.

Typical anionic surfactants include carboxylic acids or salts thereof such as fatty acids/salts having the formula $R_1COOR_2$ wherein $R_1$ is a straight chain, saturated or unsaturated, hydrocarbon radical of about 8 to about 25 carbon atoms and $R_2$ is H or a base-forming radical such as Li, Na, K, or N $R_4$ (R is independently hydrogen, alkyl, aryl or arylalkyl). Alternatively $R_2$ may be a divalent or polyvalent metal, in which case the appropriate number of acid groups is normally present in order to provide the neutral salt. Multiply valent metal ions include Mg, Ca, Sr, Ba, Cr, Mn, Fe, Co, Ni, Cu, Zn, Sn, Pb, and others. Typical fatty acid salts include sodium stearate, sodium palmitate, ammonium oleate, and triethanolamine palmitate. Additional carboxylic acids/salts useful as anionic surfactants include acids/salts, and especially sodium and potassium salts, of coconut oil fatty acids and tall oil acids as well as other carboxylic acids salt compounds including amine salts such as triethanolamine salts, acylated polypeptides, and salts of N-lauryl sarcosine such as N-dodecanoyl-N-methylglycine sodium salt. Preferred dispersing agents in the present invention are behenic acid ($R_1$=$C_{21}H_{43}$); erucic acid ($R_1$=$C_{21}H_{41}$); sodium or potassium salts of oleic acid, stearic acid, behenic acid or euric acid and/or mixtures thereof. Euricic acid may be for example in the form of rapeseed oil, a natural oil that contains approximately 40 to 50 weight percent erucic acid with the remainder consisting primarily of chains having 18 carbon atoms.

Other anionic surfactants include alkyl, arene and alkylarene sulfonates such as alkylbenzene sulfonate, linear alkylbenzene sulfonates, sodium tetrapropylene benzene sulfonate, sodium dodecylbenzene sulfonate, benzene-, toluene-, xylene-, and cumene sulfonates, lignin sulfonates, petroleum sulfonates, paraffin sulfonates, secondary n-alkanesulfonates, alpha-olefin sulfonates, alkylnaphthalene sulfonates; n-acyl-n-alkyltaurates; sulfosuccinate esters; isothionates; alkyl sulfates having the formula $R_1OSO_3\,R_2$ wherein $R_1$ and $R_2$ are defined above, such as lithium dodecyl sulfate, sodium dodecyl sulfate, potassium dodecyl sulfate, and sodium tetradecyl sulfate; alkyl sulfonates having the formula $R_1SO_3R_2$ wherein $R_1$ and $R_2$ are as defined above, such as sodium lauryl sulfonate; sulfated and sulfonated amides and amines; sulfated and sulfonated esters such as lauric monoglyceride sodium sulfate, sodium sulfoethyl oleate, and sodium lauryl sulfoacetate; sulfuric acid ester salts such as sulfated linear primary alcohols, sulfated polyethoxylated straight chain alcohols and sulfated triglyceride oils; phosphoric and polyphosphoric acid esters; perfluorinated carboxylic acids; and polymeric anionic surfactants such as alginic acids.

Also included are polymeric anionic surfactants such as salts of polymers of alkyl acrylates and/or alkyl methacrylates and acrylic and/or methacrylic acid, and salts of partial esters of maleic anhydride-styrene copolymers. An anionic surfactant may be the salt of an acid precursor reacted with a basic material to form the salt. Preferably, the acid precursor is neutralized in situ to form the salt.

Another group of materials which can be classified as anionic surfactants are those materials known as overbased or superbased materials. These are basic metal salts, preferably alkali or alkaline earth metal salts, of acidic organic compounds (carboxylic acids, sulfonic acids, phosphonic acids, phenols, and so on). Overbased materials are generally single phase, homogeneous Newtonian systems characterized by a metal content in excess of that which would be present for neutralization according to the stoichiometry of the metal and the particular acidic organic compound reacted with the metal. The overbased materials are prepared by reacting an acidic material (typically an inorganic acid or lower carboxylic acid, preferably carbon dioxide) with a mixture comprising an acidic organic compound, a reaction medium comprising at least one inert, organic solvent (mineral oil, naphtha, toluene, xylene, etc.) for said acidic organic material, a stoichiometric excess of a metal base, and a promoter such as a phenol or alcohol. The acidic organic material will normally have a sufficient number of carbon atoms to provide a degree of solubility in oil and to provide a measure of surfactant activity to the product. The amount of excess metal is commonly expressed in terms of metal ratio. The term "metal ratio" is the ratio of the total equivalents of the metal to the equivalents of the acidic organic compound: a neutral metal salt has a metal ratio of one; a salt having 4.5 times as much metal as present in a normal salt will have metal excess of 3.5 equivalents, or a ratio of 4.5.

Overbased materials are commonly used as lubricant additives and are well known to those skilled in the art. While they are useful for some applications, the scope of their utility may be different from that of other surfactants. That is, they have been observed occasionally to deposit what is believed to be calcium carbonate after exposure to an electric field. Nevertheless in situations where this is not a problem their use can be appropriate and they are accordingly considered to be within the scope of the present invention. Patents describing techniques for making basic salts of sulfonic acids, carboxylic acids, and mixtures of any two or more of these include U.S. Pat. Nos. 2,501,731; 2,616,905; 2,616,911; 2,616,925; 2,777,874; 3,256,186; 3,384,585; 3,365,396; 3,320,162; 3,318,809; 3,488,284; and 3,629,109, all of which are incorporated by reference herein in their entirety.

Cationic surfactants are similar to anionic surfactants except that the polar portion of the molecule has a positive charge. Examples of cationic surfactants include long-chain amines and their salts; such as primary amines derived from animal and vegetable fatty acids and tall oil and synthetic $C_{12}$ to $C_{18}$ primary, secondary, or tertiary amines; diamines and their salts, quaternary ammonium salts including tetraalkylammonium salts and imidazolinium salts derived from e.g. tallow or hydrogenated tallow, or N-benzyl-N-alkyl-dimethylammonium halides; polyethoxylated long-chain amines; quaternized polyethoxylated long-chain amines; and amine oxides such as N-alkyldimethylamine oxides (which are sometimes referred to as zwitterionic) such as cetyl dimethylamine oxide or stearyl dimethylamine oxide.

Zwitterionic surfactants include amino acids such as beta-N-alkylamino-propionic acids, N-alkyl-beta-iminodipropionic acids, imidazoline carboxylates, N-alkylbetaines, sulfobetaines, and sultaines.

Nonionic surfactants are materials in which the polar functionality is not provided by an anionic or cation group, but by a neutral polar group such as typically an alcohol, amine, ether, ester, ketone, or amide function. Typical nonionic surfactants include polyethoxylated alkylphenols such as polyethoxylated p-nonylphenol, p-octylphenol, or p-dodecylphenol; polyethoxylated straight-chain alcohols derived from coconut oil, tallow, or synthetic materials including oleyl derivatives; polyethoxylated polyoxypropylene glycols (block copolymers of ethylene oxide and propylene oxide), typically having molecular weights of 1000 to 30,000; polyethylene glycol; polyethoxylated mercaptans; long-chain carboxylic acid esters including glyceryl and polyglyceryl esters of natural fatty acids, propylene glycol esters, sorbitol esters, polyethoxylated sorbitol esters, polyoxyethylene glycol esters, and polyethoxylated fatty acids; alkanolamine "condensates" e.g. the condensates made by reaction of methyl or triglyceride esters of fatty acids with equimolar or twice equimolar amounts of alkanolamine; tertiary acetylenic glycols; polyethoxylated silicones, prepared by reaction of a reactive silicone intermediate with a capped allyl polyalkylene oxide such as propylene oxide or mixed ethylene oxide/propylene oxide copolymer; N-alkylpyrrolidones, and alkylpolyglycosides (long chain acetals of polysaccharides). Many of these and other ionic and non-ionic surfactants are discussed in Rosen, "Surfactants and Interfacial Phenomena," John Wiley & Sons, pp. 7-31, 1989.

Further nonionic surfactants more specifically include ethoxylated coco amide; oleic acid; t-dodecyl mercaptan; modified polyester dispersants; ester, amide, or mixed ester-amide dispersants based on polyisobutenyl succinic anhydride; dispersants based on polyisobutyl phenol; ABA type block copolymer nonionic dispersants; acrylic graft copolymers; octylphenoxypolyethoxyethanol; nonylphenoxypolyethoxyethanol; alkyl aryl ethers; alkyl aryl polyethers; amine polyglycol condensates; modified polyethoxy adducts; modified terminated alkyl aryl ethers; modified polyethoxylated straight chain alcohols; terminated ethoxylates of linear primary alcohols; high molecular weight tertiary amines such as 1-hydroxyethyl-2-alkyl imidazolines; oxazolines; perfluoralkyl sulfonates; sorbitan fatty acid esters; polyethylene glycol esters; aliphatic and aromatic phosphate esters. Also included are the reaction products of hydrocarbyl-substituted succinic acylating agents and amines These reaction products and methods for preparing them are described in U.S. Pat. Nos. 4,234,435; 4,952,328; 4,938,881; and 4,957,649, all of which are incorporated herein by reference in their entirety.

Other nonionic surfactants include functionalized polysiloxanes. These materials contain functional groups such as amino, amido, imino, sulfonyl, sulfoxyl, cyano, hydroxy, hydrocarbyloxy, mercapto, carbonyl (including aldehydes and ketones), carboxy, epoxy, acetoxy, phosphate, phosphonyl, and haloalkyl groups. These polysiloxanes can be linear or branched and generally have molecular weight above 800, i.e. up to 10,000 or 20,000. The functionality can be randomly distributed on the polymer chain or present in blocks. The functionality can be present as alkyl or alkylaryl groups as well as groups such as —$C_2H_4O)_a$—($C_3H_6O)_b$—R where a and b are independently numbers from 0 to about 100 provided that at least one of a orb is at least 1, and R is H, acetoxy, or a hydrocarbyl group. Other suitable substituent groups can include $C_3H_6X$, where X is OH, SH, or $NH_2$. Examples of such materials include SILWET™ surfactants from Union Carbide and TEGOPREN™ silicone surfactants from Goldschmidt Chemical Corp., Hopewell, Va.

Nonionic surfactants include polyoxyalkenealkyl alcohols or phenols, such as ethoxylated nonylphenol; alkanoates (preferably partial alkanoates) of polyalcohols, such as glyceryl monooleate, glyceryl monolaurate, sorbitan monooleate, sorbitan sesquioleate, sorbitan monolaurate, and sorbitan sesquilaurate, and 4,4-bishydroxylmethyl-2-heptadecenyl-2-oxazoline. Preferred materials include tall oil fatty acid neutralized with diethanolamine; TRITON™ surface active agents (from The Dow Chemical Company), including the octylphenol series with 1 to 70 ethylene oxide units and the nonylphenol series with 4 to 40 ethylene oxide units; IGEPAL™ surfactants (from Rhone-Poulenc) containing 7 to 50 ethylene oxide units; TERGTITOL™ surfactants (from The Dow Chemical Company) containing 4 to 41 ethylene oxide units; and NEODOL™ (from Shell Chemical Company) containing 3 to 13 ethylene oxide units. The foregoing commercial materials are generally linear primary alcohol ethoxylates, secondary alcohol ethoxylates, or (in the case of the TRITON materials) branched alkylphenol ethoxylates.

Preferably the dispersing agent used in the oil well treatment agent dispersion composition of the present invention is used in an amount equal to or greater than 0.1 weight percent, more preferably in an amount equal to or greater than 0.25 weight percent, and more preferably in an amount equal to or greater than 0.5 weight percent based on the total weight of the aqueous oil well treatment agent dispersion composition. Preferably the dispersing agent used in the oil well treatment agent dispersion composition of the present invention is used in amount equal to or less than 7 weight percent, more preferably in an amount equal to or less than 6 weight percent, and more preferably in an amount equal to or less than 5 weight percent based on the total weight of the oil well treatment agent dispersion composition.

The oil well treatment agent dispersion composition of the present invention optionally contains a stabilizing agent whose function is to maintain product stability across a broad spectrum of conditions. Suitable stabilizing agents may be monomeric surfactants, polymeric stabilizing agents, and/or mixtures thereof. Suitable monomer surfactants are disclosed herein above.

Preferred monomeric stabilizers are polyethoxylated nonionic surfactants. Most preferred are those having hydrophilic lipophillic balance (HLB) values of equal to or less than 16, more preferably HLB values equal to or less than 12, and most preferably those having HLB values equal to or less than 10. Not to be bound by theory, it is expected that the lower HLB nonionic surfactants adsorb to the particle of the dispersion better in the presence of the aqueous freezing point depressant.

HLB values are empirical numbers that indicate the emulsification properties of nonionic surfactants. An HLB value expresses the relative effect of the hydrophilic (water loving) portion of the surfactant (e.g., ethylene oxide chains) to the non-polar lipophilic (oil loving) portion. HLB values are generally based on experimental emulsification data. However they can be calculated in a variety of way, for example see "Surfactants and Interfacial Phenomena"; M. J. Rosen; Second Edition; John Wiley and Sons; 1989. For nonionic surfactants having just ethylene oxide chains as the hydrophilic portion, the HLB value is simply estimated by dividing the weight percent ethylene oxide by five.

A preferred nonionic surfactant for use in the present invention as a stabilizing agent is a molecule comprising two parts: a hydrophobic part or hydrophobe comprising hydrocarbyl groups and a hydrophilic part or hydrophile containing ethoxy ($CH_2CH_2O$) groups. The preferred surfactant for this invention has a hydrophobe that is either free of a phenolic group and contains 6 to 12 (more preferably 8 to 11) carbon atoms or that contains a phenolic group that is connected to 8 or 9 carbon atoms (also called an octyl phenol or a nonyl phenol, respectively) and the preferred surfactant has a hydrophile that contains 1 to 6 ethoxy groups (more preferably 2 to 4). Examples of these molecules include NEODOL™ surfactant ethoxylates (from Shell Chemical Co.) with 2 to 13 ethylene oxide units, for example an ethoxylated alcohol with a hydrophobe containing 9 to 11 carbon atoms and hydrophile, containing an average of 2.5 ethoxy groups (sold as NEODOL 91-2.5 by Shell), an ethoxylated alcohol with the hydrophobe containing a 2-ethylhexyl group and the hydrophobe containing an average of 3 ethoxy groups (sold as ECOSURF™ EH-3 by The Dow Chemical Company), and an ethoxylated nonyl phenol with 4 ethoxy groups (sold as TERGITOL™ NP-4 by The Dow Chemical Company). Preferably if an ethoxylated nonionic surfactant is used in the present invention, it is used in combination with one or more above disclosed dispersing agents.

Other polymeric stabilizers include polyvinyl alcohol or ionomers and/or salts of ethylene acrylic acid copolymers, ethylene methacrylic acid copolymers, polyacrylic acid polymers and co-polymers and associatitive types of acrylic and urethane co-polymers. The preferred polymeric stabilizers are polyacrylic polymers (sold under the trade name of CARBOPOL™ from B.F. Goodrich), and ethylene acrylic acid copolymers (sold under the trade name PRIMACOR™ from The Dow Chemical Company).

The amount of stabilizing agent varies with polymer composition and solids level but a preferred range of stabilizing agent is from 0.5 weight percent to 10 weight percent based on the total weight of the aqueous oil well treatment agent dispersion composition. More preferably from about 0.5 weight percent to 7 weight percent, and even more preferably from 0.5 weight percent to 5 weight percent based on the total weight of the aqueous oil well treatment agent dispersion composition.

If a polyethoxylated nonionic surfactant (i.e., an ethoxy-containing nonionic surfactant) is used in the present invention it may be used alone as the dispersing agent (in the amounts disclosed herein above) or in conjunction with one or more dispersing agent as a stabilizing agent. If it is used in combination with one or more dispersing agent, it is preferably used in an amount equal to or greater than 0.1 weight percent, more preferably in an amount equal to or greater than 0.25 weight percent, more preferably in an amount equal to or greater than 0.5 weight percent, more preferably in an amount equal to or greater than 1 weight percent, and more preferably in an amount equal to or greater than 2 weight percent based on the total weight of the aqueous oil well treatment agent dispersion composition. If an ethoxy-containing nonionic surfactant is used in combination with one or more dispersing agent in the present invention, it is preferably used in an amount equal to or less than 10 weight percent, more preferably in an amount equal to or less than 7 weight percent, and more preferably in an amount equal to or less than 5 weight percent based on the total weight of the aqueous oil well treatment agent dispersion composition.

The oil well treatment agent dispersion compositions of the present invention may contain one or more additional additive or mixtures of additives typically found in such compositions, for example, biocides, colorants, anti-foaming agents, and the like. Such additives are typically added in amounts less than 1 percent by weight based on the total weight of the composition.

The oil well treatment agent useful in the present invention is applied to the proppant as a dispersion in a liquid medium, preferably comprising water, in which it is not normally soluble at 10° C., and preferably also not soluble at ambient temperature, i.e., about 20° C., or even 30° C. or 40° C. That is, the medium is, first, a liquid at ambient temperature (about 20° C.) and preferably has a freezing point of 10° C. or below. Some preferred media, in particular, mixtures, have freezing points as low as 0° C., −20° C., −30° C., −40° C. or below. Moreover, the medium does not dissolve a substantial amount of the oil well treatment agent at such temperatures, preferably, ambient temperature. More specifically, the medium preferably dissolves less than 4 weight percent, more preferably less than 2 or even 1 weight percent, of the oil well treatment agent depressant at ambient temperature or moderately elevated temperatures. (In some cases the small soluble fraction may comprise impurities and unreacted materials, so that the amount of actual oil well treatment agent depressant which dissolves is proportionately even less, e.g., less than 0.5 weight percent.) Preferably the medium remains a non-solvent to 30° C. or more preferably to 40° C. or 50° C. or higher.

In order for the liquid medium to be a nonsolvent for the oil well treatment agent depressant, the medium should generally have a suitable degree of polarity. Polarity can be measured or expressed in a variety of ways. Thus in one embodiment the molecules of the solvent will preferably have 10 to 80 percent by weight heteroatoms such as oxygen or nitrogen, more preferably 20 to 70 percent, and still more preferably 25 to 60 percent by weight. Alternatively, the medium may have a dielectric constant of at least 3, preferably at least 10. The aforementioned parameters would normally be those of the medium as a whole, including, if it is a mixture, all the components as mixed.

Suitable liquid media include acetates (e.g., 2-ethoxyethyl acetate), ketones (e.g., acetone, butanone, pentanone, hexanone), or preferably, aqueous glycol mixtures (e.g., mixtures of ethylene glycol and water). Among the materials which can be used alone or in combination with water are ethylene glycol and its derivatives, such as the monomethyl ether, the monoethyl ether, the monopropyl ether, the monobutyl ether, and the monohexyl ether; diethylene glycol and its derivatives, such as the monomethyl ether, the monoethyl ether, the monopropyl ether, the monobutyl ether, and the monohexyl ether; propylene glycol and its derivatives, including the monomethyl ether, the monopropyl ether, and the monobutyl ether; and dipropylene glycol and its derivatives, such as the monomethyl ether, the monopropyl ether, and the monobutyl ether.

Other suitable types of materials useful as the liquid medium for the present invention include lactones such as butyrolactone, and alcohols such as butanol, diacetone alcohol (4-hydroxy-4-methyl-2-pentanone) 2,6-dimethyl-4-heptanol, hexanol, isopropanol, 2-ethylhexanol, and 1-pentanol.

The most preferred liquid medium is water. As defined herein, aqueous means containing, dissolved in, or dispersed in water.

In one embodiment of the present invention, suitable aqueous oil well treatment agent dispersion compositions of the present invention do not contain any acyclic, cyclic, saturated, unsaturated alkane, arene, or alkylarene hydrocarbon solvents. For example pentane, pentene, hexane, hexene, petroleum ethers, cyclohexane, benzene, toluene, xylenes, gasoline, kerosene, diesel, heavy aromatic naphtha, and the like are not suitable as the liquid medium for the present invention.

In one embodiment of the present invention, suitable aqueous oil well treatment agent dispersion compositions of the present invention do not contain any such hydrocarbon solvent, in other words, the aqueous oil well treatment agent dispersion compositions of the present invention are hydrocarbon solvent-free.

In one embodiment of the present invention, the oil well treatment agent is EVA and the EVA is dispersed not dissolved, in the liquid medium as compared to a solution where the EVA is dissolved in the liquid medium (for example where a hydrocarbon solvent is used).

For the present invention, the solution is preferably aqueous, in other words the solvent or primary dispersing liquid medium is water, but additional solvents may be added to affect processability. For example, monohydric alcohols such as methanol, ethanol, propanol, and the like; polyhydric alcohols such as ethylene glycol, propylene glycol and glycerine and the like; glycol ethers such as ethyl, propyl, butyl and hexyl ethers of ethylene glycol; diethylene glycol; propylene glycol and the like. The most preferred are methanol, ethanol, ethylene glycol, glycerine, and propylene glycol since these have the lowest molecular weights, and are relatively inexpensive and readily available. Of these, ethylene glycol is the most preferred for reasons including its non-flammability, low vapor pressure and relatively low environmental impact.

If present, the amount of a freezing point depressant agent incorporated in the aqueous dispersion composition of the present invention is dictated by the desired freezing point of the aqueous oil well treatment agent dispersion composition. In general, one or more such freezing point depressant agent can be used in an amount equal to or greater than 5 weight percent, preferably equal to or greater than 10 weight percent, and more preferably equal to or greater than 15 weight percent based on the final weight of the aqueous oil well treatment agent dispersion composition. In general, one or more such freezing point depressant agent can be used in an amount equal to or less than 40 weight percent, preferably equal to or less than 35 weight percent, and more preferably equal to or less than 30 weight percent based on the final weight of the aqueous oil well treatment agent dispersion composition.

Preferably the liquid medium is used in the oil well treatment agent dispersion of the present invention in an amount equal to or greater than 35 weight percent, more preferably in an amount equal to or greater than 40 weight percent, and more preferably in an amount equal to or greater than 45 weight percent based on the total weight of the aqueous oil well treatment agent dispersion composition. Preferably the liquid medium is used in the oil well treatment agent dispersion of the present invention in an amount equal to or less than 80 weight percent, more preferably in an amount equal to or less than 75 weight percent, and more preferably in an amount equal to or less than 70 weight percent based on the total weight of the aqueous oil well treatment agent dispersion composition.

While any method may be used, one convenient way to prepare the aqueous oil well treatment agent dispersion compositions described herein is by melt-kneading. Any melt-kneading means known in the art may be used. In some embodiments a kneader, a Banbury mixer, single-screw extruder, or a multi-screw extruder is used. The melt-kneading may be conducted under the conditions which are typically used for melt-kneading the thermoplastic resin (i). A process for producing the dispersions in accordance with the present invention is not particularly limited. One preferred process, for example, is a process comprising melt-kneading the thermoplastic polymer (i), dispersing agent (ii), and any other additives according to U.S. Pat. Nos. 5,756,659; 7,763,676; and 7,935,755, all of which are incorporated herein by reference in their entirety. A preferred melt-kneading machine is, for example, a multi screw extruder having two or more screws, to which a kneading block can be added at any position of the screws. If desired, it is allowable that the extruder is provided with a first material-supplying inlet and a second material-supplying inlet, and further third and forth material-supplying inlets in this order from the upper stream to the downstream along the flow direction of a material to be kneaded. Further, if desired, a vacuum vent may be added at an optional position of the extruder. In some embodiments, the oil well treatment agent dispersion comprising a thermoplastic polymer, a dispersing agent, and any other additives is first diluted to contain about 1 to about 3 percent by weight of water and then subsequently further diluted to comprise greater than 25 percent by weight of water. In some embodiments, the further dilution provides a dispersion with at least about 30 percent by weight of water. The aqueous dispersion obtained by the melt kneading may be further supplemented with a glycol, preferably ethylene glycol.

In some embodiments a basic substance or aqueous solution, dispersion or slurry thereof is added to the dispersion at any point of the process, preferably to the extruder. Typically the basic substance is added as an aqueous solution. But in some embodiments, it is added in other convenient forms, such as pellets or granules. In some embodiments, the basic substance and water are added through separate inlets of the extruder. Examples of the basic substance which may be used for the neutralization or the saponification in the melt kneading process include alkaline metals and alkaline earth metals such as sodium, potassium, calcium, strontium, barium; inorganic amines such as hydroxylamine or hydrazine; organic amines such as methylamine, ethylamine, ethanolamine, cyclohexylamine, tetramethylammonium hydroxide; oxide, hydroxide, and hydride of alkaline metals and alkaline earth metals such as sodium oxide, sodium peroxide, potassium oxide, potassium peroxide, calcium oxide, strontium oxide, barium oxide, sodium hydroxide, potassium hydroxide, calcium hydroxide, strontium hydroxide, barium hydroxide, sodium hydride, potassium hydride, calcium hydride; and weak acid salts of alkaline metals and alkaline earth metals such as sodium carbonate, potassium carbonate, sodium hydrogencarbonate, potassium hydrogencarbonate, calcium hydrogencarbonate, sodium acetate, potassium acetate, calcium acetate; or ammonium hydroxide. In particular embodiments, the basic substance is a hydroxide of an alkaline metal or a hydroxide of an alkali metal. In some embodiments, the basic substance is selected from potassium hydroxide, sodium hydroxide and combinations thereof.

When the oil well treatment agent is a solid it has an advantageous particle size distribution. In particular embodiments, the dispersed oil well treatment agent has a particle size distribution defined as volume average particle diameter (Dv) divided by number average particle diameter (Dn) of equal to or less than 2.5, preferably equal to or less than 2.0. In other embodiments, the dispersions have a particle size distribution of less than or equal to 1.9, 1.7, or 1.5.

A preferred volume average particle size is equal to or less than 2 micron (µm), preferably equal to or less than 1.5 µm, preferably equal to or less than 1.2 µm, and more preferably equal to or less than 1 µm. In other embodiments, the average particle size ranges from 0.05 µm to 1 µm. In still other embodiments, the average particle size of the dispersion ranges from 0.1 µm to 1.2 µm, preferably 0.2 µm to 1 µm. For particles that are not spherical the diameter of the particle is the average of the long and short axes of the particle. Particle sizes can be measured on a Coulter LS230 light-scattering particle size analyzer or other suitable device.

The dispersions of the present invention have a pH of from about 8 to about 12, preferably from about 8.5 to about 11.5, more preferably from about 8.5 to about 11.

In a preferred embodiment of the present invention the proppant, which is generally sand, lightweight ceramic, or bauxite, is coated with one or more oil well treatment agent.

The first step in the methods of the instant invention is obtaining a suitable particulate material. For the purposes of the present disclosure, the term proppant will be used to refer to any particulate solid material which is stable at the conditions that will be encountered in the producing formations over a long period of time. Specifically, it is preferred that the granular material be hard, rigid, generally spheroidal particles of material which are substantially inert to crude oil, natural gas, water, brine and other fluids naturally present in subterranean formations and producing wells, as well as to fluids commonly injected into subterranean petroleum formations for the purpose of stimulating oil production.

Particulate substrates, or proppants, also termed "particles" herein, suitable for use with the present invention can be selected from any propping agent suitable for hydraulic fracturing known in the art. Examples include, but are not limited to, natural materials, silica proppants, ceramic proppants, metallic proppants, synthetic organic proppants, sintered bauxite, and combinations thereof.

Natural products suitable for use as particulates in the present disclosure include, but are not limited to, nut shells such as walnut shells, Brazil nut shells, and macadamia nut shells, as well as fruit pits such as peach pits, apricot pits, olive pits, and any resin impregnated or resin coated version of these.

Silica particles suitable for use with the present invention include, but are not limited to, glass spheres and glass microspheres, glass beads, silica quartz sand, silicon carbide, and sands of all types such as white (for example "Northern White") or brown. Typical silica sands suitable for use include Ottawa, Jordan, Brady, Hickory, Ariz., and Chelford, as well as any resin coated version of these sands.

Other suitable proppants include a variety of naturally occurring minerals and their oxides. Such compounds include alumina, cordierite, gilsonite, mullite, calcium oxide, and zirconium oxide.

Ceramic proppants suitable for use with the methods of the present invention include, but are not limited to, ceramic beads, ceramic oxides, ultra lightweight porous ceramics, and economy lightweight ceramics as well as any resin coated or resin impregnated versions of these.

Metallic particles suitable for use with the embodiments of the present invention include, but are not limited to, aluminum shot, aluminum pellets, iron shot, steel shot, and the like, as well as any resin coated versions of these metallic proppants.

Synthetic particles are also suitable for use with the present invention. Examples of suitable synthetic particles include, but are not limited to, plastic particles or beads, nylon beads, nylon pellets, SDVB beads, and resin agglomerate particles similar to "FlexSand MS", as well as resin coated versions thereof.

Diatomatious earth is not a proppant useful for the present invention.

As a practical matter, naturally occurring particulate materials such as small pebbles, gravel or sand are often used. The preferred proppant has a predominant portion of its particle size in the range of minus 20 mesh to plus 40 mesh, or minus 16 mesh to plus 30 mesh, with the actual distribution further restricted based on the well to be treated. Suitable mesh sizes for use with the present invention include 8/12, 8/14, 8/16, 12/18, 12/20, 16/20, 16/30, 20/40, 30/50, and 40/70. Generally, the 20/40 mesh proppant comprises the majority of the product used. Larger sized proppants can allow for higher flow rate of oil and/or gas, but are more prone to fracture and may not be suitable for formations with very high pressure. However, both larger and smaller grain proppants are required for different types and depths of wells.

Generally no special pretreatment of the proppant will be required prior to subjecting it to the various treatments to be described below, although if the proppant is seriously contaminated with oil or other materials, it should be washed by some suitable means to remove the oily materials from the surface which might interfere with the proper coating of the various fluids.

The present invention can be carried out with any suitable substrate. Choice of the particular substrate is governed by the properties required by the specific application.

The coating composition according to the invention may be applied to the surface of the proppant particle using coating techniques well known to those skilled in the art. By way of non-limiting example, if the oil well treatment agent is a thermoplastic polymer, for example EVA, the EVA and proppant may be mechanically mixed in a mixer at a temperature above the melting point of the polymer to provide polymer coated proppant. Alternatively, if the oil well treatment agent is a thermoplastic polymer, for example EVA, the proppant may be heated and mechanically mixed with the EVA polymer to provide a polymer coated proppant, wherein the proppant is heated sufficiently to melt the polymer. Preferably the oil well treatment agent is applied as a solution or dispersion, more preferably as an aqueous dispersion. An aqueous dispersion oil well treatment agent composition and proppant may be blended in a mixer with mechanical agitation or the aqueous coating composition may be sprayed onto a moving bed or falling stream of the proppant. Or some combination of spraying the coating composition onto the proppant followed by mixing with mechanical agitation may be used.

The proppant particles may be heated or not. Some coating compositions merely benefit from the more rapid evaporation of the emulsifying water from the coating.

In one embodiment of the present invention, the coating comprising a polymer that contains no cross-linking.

In another embodiment of the present invention, the coating comprises a polymer with cross-linking.

There is no particular limitation on how much coating should be applied to a particle. In some embodiments, it may be preferred that the total weight of the proppant comprise between about 1 ppm and about 10,000 ppm of the coating, on a dry basis. In a preferred embodiment, the amount of coating on the proppant, on a dry basis, is equal to or less than 10,000 ppm of particle weight, alternatively equal to or less than 5,000 ppm of particle weight, alternatively equal to or less than 2,000 ppm of particle weight, or alternatively equal to or less than 1,000 ppm of particle weight. In another preferred embodiment, the amount of coating on the particle, on a dry basis, is equal to or greater than 300 ppm, alternatively equal to or greater than 700 ppm of particle weight.

The oil well treatment agent is provided as at least a partial coating on the particle. Generally, the oil well treatment agent coating on the particle completely surrounds the particle. In accordance with the present invention, the oil well treatment agent coating is from about 0.5 percent to about 15 percent by weight of the particle. For example, the weight percent of the thermoplastic coating, based on the weight of the particle, can be from about 1 percent to about 12 percent, from about 1 percent to about 10 percent, or from about 1 percent to about 8 percent. In other aspects, the weight percent of the oil well treatment agent coating, based on the weight of the particle, is from about 1.5 percent to about 8 percent, from about 2 percent to about 7 percent, or from about 2.5 percent to about 6 percent by weight. Yet, in another aspect, the weight percent of the oil well treatment agent coating, based on the weight of the particle, is from about 5 percent to about 8 percent by weight.

The coating thickness on an individual particle typically is within a range from about 0.1 to about 5 mils, for example, between about 0.2 and about 4 mils, or between about 0.3 and about 3 mils. In another aspect, the thickness of the thermoplastic coating on the particle is in a range from about 0.5 to about 2.8 mils, or from about 0.6 to about 2.5 mils. Further, the thickness of the thermoplastic coating on the particle can be from about 0.75 mils to about 2 mils in other aspects of this invention.

It should be noted that to achieve this beneficial effect, it is not necessary that all particles within a batch (e.g., a truckload) be coated with the coating composition as described herein and/or coated with the same oil well treatment agent.

Rather, in some embodiments, it may be desirable to only coat a fraction of the particles, for instance to reduce costs. By way of example, it may be desirable to coat 90 weight percent or less of the particles, alternatively 70 weight percent or less, or alternatively 50 weight percent or less. In some embodiments, it may be desirable for at least 20 weight percent, alternatively at least 30 weight percent, or alternatively at least 40 weight percent of the particles in a proppant batch to be coated. The coated particles however should be blended in with the uncoated particles prior to transport and further handling that may induce dust to form.

Alternatively, a mixture of two or more, three or more, four or more, five or more, etc., particles having different oil well treatment agent coatings could be particularly useful.

In one embodiment, the coating comprises: a) an ethylene-vinyl acetate copolymer in an amount of from 80 to 99 weight percent; b) a dispersing agent in an amount of from 1 to 20 weight percent; and c) optionally an aqueous freezing point depressant.

In one embodiment, the oil well treatment coating on the proppant is soluble in oil, such that as the oil flows over the proppant, the treatment agent will slowly dissolve into the oil where it can subsequently treat the oil in its intended manner In a preferred embodiment the oil well treatment agent coating is a thermoplastic polymer without cross-linking. The polymer needs to dissolve into the oil (e.g., it is miscible with oil, in other words the oil/agent mixture forms a single phase as opposed to a swollen polymer that is not miscible with the oil which would form a second phase). The coating should dissolve slowly over time. Coating thickness, polymer molecular weight, and polymer architecture (including polarity of the polymer) will all play a function in the dissolution time. Reversible cross-linking may also be employed to cause the polymer to slowly be released into the oil over time. The polymer must be soluble in the oil at a level that it can effectively treat the oil. For example, EVA as a wax inhibitor and/or pour point depressant needs to be soluble in the oil at a concentration that is effective in treating the oil, preferably from 100 ppm to 5000 ppm. This range will vary based on the polymer type, molecular weight, crude oil composition, and the like.

In one aspect of the present invention, the coated proppants of the present invention can be used to treat a subterranean formation.

In the practice of this invention, the injection of an initial charge of the mixture of coated proppants and fluid/foam into the well bore can be carried out in any conventional method of injecting fluids/foams into a well bore of an oil or gas well. Such convention methods include truck treating, continuous injection, or high pressure pumping. The mixture of coated proppants and fluid/foam is injected at a rate sufficient to increase pressure at the target depth (determined by the location of the well casing perforations), to exceed that of the fracture gradient (pressure gradient) of the rock. The fracture gradient is defined as pressure increase per unit of depth relative to density, and is usually measured in pounds per square inch, per foot, or bars per meter. The rock cracks and the fracture fluid comprising the coated proppant permeate the rock extending the crack further, and further, and so on.

The solution which is injected will typically comprise the desired oil well treatment agent(s) coated proppant in a solution wherein the fluid is an organic solvent or more preferably an aqueous solution, i.e., water. The relative amounts of the fluid and oil well treatment agent coated proppant of the solution to be injected into the well bore will of course vary depending upon the agent and fluid involved, but will typically be of a fluid to oil well treatment agent coated proppant ratio in the range of about 10:90 to about 95:5, by weight.

In one embodiment, the present invention is a method of treating a subterranean formation comprises the step of injecting a fluid suspension of an oil well treatment agent coated proppant into the subterranean formation at a rate sufficient to increase pressure at the target depth, to exceed that of the fracture gradient of the rock, wherein the coated proppant comprises a) a particle and b) a coating comprising one or more of a wax inhibitor, a pour point depressant, a scale inhibitor, an asphaltene inhibitor, an asphaltene dispersant, a corrosion inhibitor, a biocide, a drag reducing agent, a viscosity modifier, or a de-emulsifier.

EXAMPLES

In Examples 1 to 3 mixing is performed in a KitchenAid Professional 5 quart mixer. Mixing is accomplished at the fifth speed setting (out of ten). A powdered poly (ethylene-co-vinyl acetate) or EVA having a molecular weight of about 100,000 g/mol is used.

Example 1

1kg of Northern White Sand of 20/40 mesh size is heated in an oven to 50° C. above the melting point of the EVA. The heated sand is then poured into a pre-heated KitchenAid bowl already in place with mixer. To the heated sand is added 10 g of EVA. The sand/EVA mixture is mixed for three minutes then while mixing is continued, ambient air is applied to cool the sand/EVA mixture until the EVA-coated sand is free flowing.

Example 2

1 kg of Northern White Sand of 20/40 mesh size is heated in an oven to 150° C. and then poured into a pre-heated KitchenAid bowl already in place with mixer. While mixing, to the heated sand is added 0.1 g of MOMENTIVE SILQUEST™ A-1100 aminosilane (gamma-aminopropyltriethoxysilane, CAS #919-30-2), a mixture of 5 g of VORAPEL™ T5001 polyether polyol available from The Dow Chemical Company (about 193 g/mol equivalent weight polyether polyol), and 10 g of 40 weight percent solids EVA aqueous dispersion, 0.1 g of dibutyltin dilaurate (CAS #77-58-7), and 0.2 g of DABCO™ TMR trimerization catalyst from Air Products & Chemicals, Inc. After mixing for 1 minute, 20 g of PAPI™ 20 polymeric MDI isocyanate (nominal functionality 3.2, and % NCO of about 30%) available from The Dow Chemical Company is added to the mixture while mixing over 1 minute. Mixing is continued until the coated sand particles are free flowing.

Example 3

1 kg of Northern White Sand of 20/40 mesh size is heated in an oven to 150° C. and then poured into a pre-heated KitchenAid bowl already in place with mixer. While mixing, 10 g of 40 weight percent solids EVA aqueous dispersion is added to the hot sand. After 1 minute of mixing, a 50 weight percent solids dispersion of HYPOD™ XU 31683 polyolefin water dispersion from The Dow Chemical Company (aqueous acid-modified ethylene polymer based polyolefin dispersion) is added to the mixture over 1 minute. The sand/EVA/polyolefin mixture is mixed for three minutes then while mixing is continued, ambient air is applied to cool the coated sand mixture until the EVA/polyolefin-coated sand is free flowing.

Examples 4 to 10 and Comparative Examples A and B

The compositions for Examples 4 to 10 and Comparative Example A are given in Table 1, in Table 1:

"DCA" is a dust control agent which is an aqueous solution comprising water, a surfactant and a polymer binder of the type described in WO2015073292 (A1);

"PPD" is a pour point depressant that comprises a 50 wt % aqueous-based dispersion of an ethylene vinyl acetate (EVA) copolymer with a surfactant as described in WO2012170241 (A1);

"SI" is a tagged scale inhibitor, comprising a functionalized acrylic acid-based copolymer available as ACCENT™ 1100T from The Dow Chemical Company;

"50:50 DCA:PPD" is defined as a 50/50 wt % mixture of DCA and PPD;

and

"50:50 DCA:SI" is defined as a 50/50 wt % mixture of DCA and SI.

Procedure to Prepare Coated Sand.

Northern White Sand (750 g) with 20/40 mesh size is heated in an oven to 80° C. and then poured into a pre-heated KitchenAid mixing bowl already in place with mixer. While mixing, the oil treatment agent formulation (i.e., 50:50 DCA:PPD) is slowly added to the hot sand via syringe, and then mixed in the KitchenAid mixer for the desired amount of time to give the sand coated with an oil-treatment reagent. The details for each example are outlined in Table 1.

TABLE 1

| Ex | Oil Treatment Agent Formulation | Wt % Oil Treatment Reagent | Weight Oil Treatment Reagent (g) | Temp Sand (° C.) | Mixing Time (min) |
|---|---|---|---|---|---|
| 4 | 50:50 DCA:PPD | 0.2 | 1.5 | 84 | 1.5 |
| 5 | 50:50 DCA:PPD | 1 | 7.5 | 80 | 1.5 |
| 6 | 50:50 DCA:PPD | 2 | 15 | 81 | 2.5 |
| 7 | 50:50 DCA:SI | 0.2 | 1.5 | 80 | |
| 8 | 50:50 DCA:SI | 1 | 7.5 | 90 | |
| 9 | 50:50 DCA:SI | 2 | 15 | 90 | |
| 10 | PPD | 1 | 7.5 | 80 | 1.5 |
| Com Ex A | None | 0 | 0 | 80 | 0 |

Test 1—Test to Determine Effectiveness as Pour Point Depressants.

T1.1

10 mL of crude oil from Congo (which is heated at 50° C. for 1 hour to homogenize it) is placed in a scintillation vial. The sand, coated with the one of the PPD or DCA:PPD oil treatment reagents (examples 4-6, 10) is then added to the vial. The oil/sand mixture is heated for 20 minutes at 40° C. in a water bath, and then mixed using a vortex mixer for 1 minute. The sand is allowed to settle and then the crude oil is isolated by decanting it from the sand. The pour point of the crude oil is then measured using a PAC MPP 5G Cloud and Pour Point Analyzer in accordance with ASTM D7689-11 and ASTM D7346. The pour point data is presented in Table 2.

T1.2

To determine if any oil treatment reagent remained on the sand, 10 g of fresh Congo crude oil is added to the sand sample from T1 and allowed to sit overnight. The next day, the crude oil/sand mixture is heated to 40° C. for 20 minutes. The sand is allowed to settle and then the crude oil is isolated by decanting it from the sand. The pour point of the crude oil is then measured using a PAC MPP 5G Cloud and Pour Point Analyzer in accordance with ASTM D7689-11 and ASTM D7346. The data are presented in Table 2.

T1.3

The experiment is repeated a third time, and 10 g of fresh Congo crude oil is added to the isolated sand and allowed to sit overnight. The next day, the crude oil/sand mixture is heated to 40° C. for 20 minutes. The sand is allowed to settle and then the crude oil is isolated by decanting it from the sand. The pour point of the crude oil is then measured using a PAC MPP 5G Cloud and Pour Point Analyzer in accordance with ASTM D7689-11 and ASTM D7346.

Comparative Example A

Tests T1.1 to T1.3 are performed on pure sand that does not contain a coating. The pour point data is presented in Table 2.

Test 2—Test to Determine Effectiveness as Pour Point Depressants After Exposure to Frac Fluid.

T2.1

The sand coated with PPD or DCA:PPD oil treatment reagent (Examples 4-6 and 10) is first soaked in a frac fluid, having the composition shown in Table 3, for 24 hours at 20° C. The water is then decanted and the isolated sand is allowed to dry overnight. The sand (weights are listed in Table 2) is then added to 10 g of Congo crude oil. The crude oil/sand mixture is heated to 40° C. for 20 minutes. The sand is allowed to settle and then the crude oil is isolated by decanting it from the sand. The pour point of the crude oil is then measured using a PAC MPP 5G Cloud and Pour Point Analyzer in accordance with ASTM D7689-11 and ASTM D7346. The pour point data are shown in Table 2.

Comparative Example B

The above procedure is performed on pure sand that was not coated with an oil treatment reagent.

TABLE 2

| | Ex | | | | | | |
|---|---|---|---|---|---|---|---|
| | 4 | 5 | 6 | 10 | Com Ex A | Pure Crude Oil | Com Ex B |
| Amount of sand added (g) | 1 | 2 | 2 | 1 | 2 | | |
| Test 1 | | | | | | | |
| T1.1 (° C.) | −6 | −36 | −27 | −21 | 6 | 6 | |
| T1.2 (° C.) | 6 | −6 | −3 | −6 | 12 | 12 | |
| T1.3 (° C.) | 6 | 6 | 3 | 6 | 6 | 6 | |
| Test 2 | | | | | | | |
| T2.1 (° C.) | −2 | −6 | −18 | −12 | | 12 | 14 |

TABLE 3

| Component | Weight for 1 L of frac fluid |
|---|---|
| DI H$_2$O | 972.92 g |
| NaCl | 3.12 g |
| NaHCO$_3$ | 0.13 g |
| Na$_2$SO$_4$ | 0.17 g |
| 1% KCl | 4.77 g |
| 1% CaCl$_2$ | 7.20 g |
| 1% MgSO$_4$ | 5.45 g |
| 1% Na$_2$CO$_3$ | 4.39 g |
| Dimethylformamide (DMF) | 20 mg |
| Polyacrylamide | 880 mg |
| Ammonium Bisulfite | 20 mg |
| Ethylene glycol | 430 mg |
| UCARSIDE ™ 50 | 500 mg |

Test 3—Test to Determine the Effectiveness as a Scale Inhibitor Via Static Bottle Test.

The scale inhibitor coated sand (Example 8) is evaluated in a test brine solution for inhibition effectiveness. The evaluations are done at 5 varying concentrations: 10, 25, 50 and 100 ppm of the scale inhibitor (based on % actives).

Preparation of Brine Solution.

The composition of the test brine solution for evaluating scale inhibition effectiveness for the scale inhibitor coated sand is made up in accordance with NACE TM0374 method and is a combination of a calcium-containing brine solution and a bicarbonate-containing brine solution. A 1,000 mL calcium-containing brine solution is prepared by adding 12.15 g $CaCl_2 2H_2O$, 3.68 g $MgCl_2 6H_2O$, and 33 g NaCl and dissolving to 1,000 mL with deionized water. A 1,000 mL bicarbonate-containing brine is prepared by adding 7.36 g $NaHCO_3$ and 33 g NaCl and dissolving to 1,000 mL with deionized water.

Scale Inhibitor Sample Preparation for Scale Inhibition Evaluation.

Into a 125 mL glass bottle is added a predetermined amount of scale inhibitor coated sand (0.4 g for 10 ppm, 1.0 g for 25 ppm, 2.0 g for 50 ppm, 4.0 g for 100 ppm). After addition of the sand, then 50 mL of bicarbonate-containing brine stock solutions is added to each bottle followed by addition of 50-ml of the calcium-containing brine. After which, the bottles are capped and immediately agitated to mix the contents. Duplicate test solutions are prepared for each sample. A blank solution of brine (50 mL of each brine solution) with 1.0 g of sand (no coating of scale inhibitor) is also prepared, capped, and agitated. The test bottles are placed in an oven at 71° C. for 24 hours. Then removed and cooled to ambient temperature for a time not to exceed two hours.

Inductively Coupled Plasma (ICP) Testing.

Scale inhibition is determined by ICP. The following procedure is followed to prepare the samples for ICP analysis:

1. Add approximately 1 g of inhibitor solution via a filtered syringe into a 50 mL ICP vial.
2. Dilute the sample to approximately 40 g with a solution of 0.25 N HCl,
3. Add approximately 0.5 g of the calcium-containing brine stock solution to 40 g with 0.25 N HCl for use as blank reference samples,
4. Cap each ICP vial and mix the contents well,
5. Record the weights of each sample, and
6. Determine calcium ion concentration.

The calcium ion concentrate for each sample is determined by ICP. According to the NACE TM0374 method calcium ion concentration values for duplicate samples often differ by 2 percent or more. A 5% difference in calcium ion concentration is considered unacceptable and this result is discarded and the test repeated. The scale inhibition (% inhibition) results are shown in Table 4.

Percent Inhibition is calculated according to the following formula:

$$\frac{[Ca]\ final\ treated\ concentration - [Ca]\ blank\ after\ precip}{[Ca]\ blank\ before\ precip - [Ca]\ blank\ after\ precip} \times 100$$

TABLE 4

| | Ex 8 (g) | | | |
|---|---|---|---|---|
| | 0.4 | 1 | 2 | 4 |
| 2 hour (% Inhibition) | 50 | 50 | 3 | 44 |
| 24 hour (% inhibition) | 17 | 7 | 0 | 8 |

What is claimed is:

1. A coated proppant for treating oil comprising
   i) a particle, and
   ii) a coating comprising a treatment agent comprising
      a an ethylene-vinyl acetate copolymer in an amount of from 80 to 99 weight percent, and
      b a dispersing agent in an amount of from 1 to 20 weight percent, wherein weight percents are based on the total weight of the coating, and
   iii) a cross-linked polyurethane polymer,
   wherein the coating will dissolve in oil such that the treatment agent can treat the oil.

2. The coated proppant of claim 1 wherein the treatment agent further comprises one or more of a wax inhibitor, a pour point depressant, a scale inhibitor, an asphaltene inhibitor, an asphaltene dispersant, a corrosion inhibitor, a biocide, a drag reducing agent, a viscosity modifier, a dust control agent, or a de-emulsifier.

3. The coated proppant of claim 1, wherein the treatment agent further comprises
   c an aqueous freezing point depressant.

4. A method of preparing a coated proppant for treating oil, the method comprising:
   applying a coating of a treatment agent comprising an ethylene-vinyl acetate copolymer that is applied onto a particle as an aqueous dispersion, the aqueous dispersion comprises
      a an ethylene-vinyl acetate copolymer in an amount of from 12 to 50 weight percent,
      b a dispersing agent in an amount of from 1 to 10 weight percent,
      c water, and
      d a cross-linked polyurethanepolymer;
   wherein weight percents are based on the total weight of the aqueous dispersion composition, and the coating will dissolve in oil such that the treatment agent can treat the oil.

5. The method of claim 4 wherein the treatment agent further comprises one or more of a wax inhibitor, a pour point depressant, a scale inhibitor, an asphaltene inhibitor, an asphaltene dispersant, a corrosion inhibitor, a biocide, a drag reducing agent, a viscosity modifier, a dust control agent, or a de-emulsifier.

6. The method of claim 4 wherein the treatment agent aqueous dispersion further comprises
   d an aqueous freezing point depressant.

7. A method of treating a subterranean formation comprising the step of injecting a fluid suspension of an oil well treatment agent coated proppant into the subterranean formation at a rate sufficient to increase pressure at the target depth, to exceed that of the fracture gradient of the rock, wherein the coated proppant comprises:
   i) a particle and
   ii) a coating comprising a treatment agent that comprises
      a an ethylene-vinyl acetate copolymer in an amount of from 80 to 99 weight percent,
      b a dispersing agent in an amount of from 1 to 20 weight percent, and
      c a cross-linked polyurethane polymer, wherein weight percents are based on the total weight of the coating, and the coating will dissolve in oil such that the treatment agent can treat the oil.

8. The method of claim 7 wherein the treatment agent further comprises one or more of a wax inhibitor, a pour point depressant, a scale inhibitor, an asphaltene inhibitor, an asphaltene dispersant, a corrosion inhibitor, a biocide, a drag reducing agent, a viscosity modifier, a dust control agent, or a de-emulsifier.

9. The method of claim 7 wherein the treatment agent further comprises
c an aqueous freezing point depressant.

* * * * *